United States Patent Office 3,372,114
Patented Mar. 5, 1968

3,372,114
PROCESS FOR PREPARING THICKENED MINERAL OIL COMPOSITIONS
Rudolph J. Rense, Gates Mills, Ohio, assignor to The Lubrizol Corporation, Wickliffe, Ohio, a corporation of Ohio
No Drawing. Filed Feb. 25, 1965, Ser. No. 435,333
14 Claims. (Cl. 252—33)

ABSTRACT OF THE DISCLOSURE

Gelled materials useful as lubricant additives in greases are prepared by contacting (A) a fluid mineral oil solution of a carbonated, basic complex of an alkaline earth metal and an organic carboxylic or sulfonic acid, salt thereof, or carboxylic ester containing at least 12 aliphatic carbon atoms, the complex being characterized by a metal ratio of at least about 4.5, with (B) oxygen at a temperature of about 150° C. to about 300° C.

---

This invention relates to a process for preparing thickened mineral oil compositions of uniform characteristics. In a more particular sense, it relates to a process for preparing homogeneous grease compositions characterized by a high degree of basicity which are useful as lubricants, corrosion preventing coatings, etc.

Lubricating oils under conditions of severe use, especially in an internal combustion engine, are subjected to the effects of heat, age, contact with air, water, metals, and other contaminants which cause deterioration of the oil. Many of the deterioration products thus formed are corrosive to the metal engine parts or are insoluble in the lubricating oil giving rise to sludge and varnish. It is common practice to incorporate a highly basic detergent additive into lubricating oils to combat the harmful effects of such deterioration products. Detergent additives which are useful for preventing the formation of harmful sludge and varnish deposits in the equipment being lubricated are illustrated by the oil-soluble metal complexes of oil-soluble acids such as sulfonic acids and carboxylic acids. The so-called basic metal complexes, i.e., those in which the metal is present in a stoichiometrically greater amount than the organic acid radical, are especially effective because in addition to their detergency they have the ability to counteract the corrosive, acidic products of oil degradation. In general, the higher degree of basicity of the metal complex, the more effective it is as a lubricant additive.

Lubricating greases and greases which are applied to metal surfaces as corrosion inhibiting coatings are often subjected to the deteriorating effects of age, heat, contact with air, water, metals, salts and other contaminants which frequently give rise to corrosive, acidic products. It has been found that unusually effective lubricating and corrosion preventing greases may be prepared by the novel process of gelling a fluid mineral oil solution of a carbonated highly basic alkaline earth metal detergent additive. Greases prepared by this process have a very high degre of alkalinity, high melting points, and excellent homogeneity. They also possess excellent lubricating qualities.

Accordingly, it is an object of this invention to provide a process for preparing a homogeneous grease having a high degree of basicity.

It is also an object of this invention to provide a process for preparing a grease which is resistant to deterioration and the formation of harmful deterioration products.

It is also an object of this invention to prepare a homogeneous grease having a high degree of basicity.

It is also an object of this invention to provide a thickened homogeneous mineral oil composition capable of improving the viscosity index properties of lubricating oils.

It is also an object of this invention to provide a lubricant additive and corrosion-inhibiting compositions.

It is also an object of this invention to provide corrosion-inhibiting coating compositions for metals.

It is also an object of this invention to provide corrosion-inhibiting coating compositions for metals, which compositions may be easily and inexpensively applied to metal surfaces.

These and other objects are accomplished by the process for preparing a homogeneous gel comprising contacting with oxygen at a rate of at least about 1% by volume per minute and at a temperature of from about 150° C. to about 300° C. a fluid mineral oil solution containing from about 10% to about 70% by weight of a carbonated, basic complex of an alkaline earth metal with an organic compound having at least about 12 aliphatic carbon atoms and selected from the group consisting of sulfonic acids, carboxylic acids, and carboxylic acid esters, said carbonated, basic complex having a metal ratio of at least about 4.5.

The carbonated, basic alkaline earth metal complexes useful in the above process are complexes of magnesium, calcium, strontium, and barium with an oil-soluble, high molecular weight sulfonic acid, carboxylic acid, or carboxylic acid ester. Mixtures of such complexes are also useful. The acid or ester should contain at least about 12 aliphatic carbon atoms in the molecule and may contain up to about 1000 aliphatic carbon atoms or even more in the case of some acids such as those derived from polymers of low molecular weight olefins. The acids or esters should preferably contain from about 12 to about 75 aliphatic carbon atoms.

The sulfonic acids include the aliphatic and aromatic sulfonic acids. They are illustrated by petroleum sulfonic acids or acids obtained by treating an alkylated aromatic hydrocarbon with a sulfonating agent, e.g., chlorosulfonic acid, sulfur trioxide, oleum, sulfuric acid, or sulfur dioxide and chlorine. The sulfonic acids obtained by sulfonating alkylated benzene, naphthalene, phenol, phenolsulfide, or diphenyl oxide are especially useful.

Specific examples of the sulfonic acids are petroleum mahogany sulfonic acid, monowax (eicosane) substituted naphthalenesulfonic acid, dodecylbenzenesulfonic acid, didodecylbenzenesulfonic acid, dinonylbenzenesulfonic acid, octadecyldiphenyl ether sulfonic acid, octadecyldiphenylaminesulfonic acid, cetylchlorobenzenesulfonic acid, bis-cetylphenyl disulfide sulfonic acid, cetoxycaprylbenzensulfonic acid, dilauryl-beta-naphthalenesulfonic acid, the sulfonic acid derived by the treatment of polyisobutylene having a molecular weight of 1500 with chlorosulfonic acid, nitronaphthylenesulfonic acid, paraffin wax sulfonic acid, cetylcyclopentanesulfonic acid, laurylcyclohexanesulfonic acid, and polyethylene (molecular weight of 750) sulfonic acid, etc.

Also useful are the aliphatic or aromatic carboxylic acids. They are exemplified by palmitic acid, stearic acid, myristic acid, oleic acid, linoleic acid, behenic acid, hexatriacontanoic acid, tetrapropylene-substituted glutaric acid, polyisobutene (molecular weight of 5,000) substituted succinic acid, polypropylene (molecular weight of 10,000) substituted succinic acid, octadecyl-substituted adipic acid, chlorostearic acid, 9-methyl-stearic acid, dichlorostearic acid, stearylbenzoic acid, polywax (eicosane) substituted naphthoic acid, dilauryldecahydronaphthalenecarboxylic acid, didodecyltetralincarboxylic acid, dioctylcyclohexenecarboxylic acid, and the anhydrides of such acids.

Examples of the carboxylic acid esters which are useful for the process of this invention include methyl oleate, ethyl oleate, butyl oleate, lauryl oleate, methyl stearate, ethyl stearate, butyl stearate, glycerol monooleate, glycerol distearate, glycerol trilaurate, sperm oil, the methyl, ethyl, propyl or glycerol esters of tall oil acids and other natural or synthetic fatty acid esters.

The carbonated, basic alkaline earth metal complexes of the above-illustrated oil-soluble compounds should have metal ratios of at least about 4.5. The term "metal ratio" is used herein to designate the ratio of the total chemical equivalents of the metal in the metal complex to the chemical equivalents of the metal which is in the form of a normal salt, i. e., a neutral salt of the organic acid. To illustrate, a metal salt containing 5 equivalents of the metal per equivalent of the organic acid radical has a metal ratio of 5; and a neutral metal salt has a metal ratio of 1. The use of salts having metal ratios of between about 8 and 20 have been found to be most advantageous, although salts having metal ratios up to about 60 or higher likewise are effective.

A convenient process for preparing the carbonated, basic metal complexes comprises carbonating a substantially anhydrous mixture of the acid or ester with at least about 4.5 chemical equivalents of an alkaline earth metal base per equivalent of the acid or ester in the presence of a promoting agent. The metal base may be an alkaline earth metal oxide, hydroxide, bicarbonate, sulfide, mercaptide, hydride, alcoholate, or phenate. It is preferably an oxide, alcoholate, or hydroxide of barium or calcium. The carbonation is carried out in a solvent which may be a mineral oil, n-hexane, naphtha, n-decane, dodecane, benzene, toluene, xylene, or other fluid hydrocarbons. The preferred solvent for the carbonation is a mineral oil.

The promoting agent is preferably an alcohol or a phenol; it may be a mercaptan, amine, aci-nitro compound, or an enolic compound. The alcohols and phenols useful as promoting agents include, for example, methanol, ethanol, isopropanol, cyclohexanol, decanol, dodecanol, behenyl alcohol, ethylene glycol, diethylene glycol, triethylene glycol, monomethyl ether of ethylene glycol, trimethylene gycol, hexamethylene glycol, glycerol, pentaerythritol, benzyl alcohol, phenylethyl alcohol, phenol, naphthol, cresol, catechol, p-tert-butylphenol, heptylphenol, m-polyisobutene (molecular weight of 350) substituted phenol, o,p-didodecylphenol, alpha-hexyl-beta-naphthol, m-cyclo-hexylphenol, 4,4'-methylene bisphenol, 2,2'-methylene-4,4'- dioctyl bisphenol, etc. Other compounds useful as the promoting agent are illustrated by ethyl acetoacetate, acetylacetone, acetamide, ethanolamine, diethanolamine, triethanolamine, nitromethane, nitropropane, nitrodecane, nitrobenzene, nitrotoluene, methylamine, dimethylamine, aniline, phenylenediamine, N,N'-dimethylphenylenediamine, toluidine, cyclohexylamine, N-methyldecylamine, naphthylamine, o-chlorophenol, m-nitrophenol, o-methoxyphenol, thiophenol, methyl mercaptan, dodecyl mercaptan, isooctyl mercaptan, benzyl mercaptan, etc.

It will be noted that when an alkaline earth metal base is mixed with a sulfonic or carboxylic acid a metal salt is formed so that the process mixture before carbonation contains a metal salt of the acid and a large excess of the metal base. Such a mixture is heterogeneous primarily because of the presence of the large excess of the insoluble metal base. As carbonation proceeds, the metal base becomes solubilized in the organic phase and the carbonated product eventually becomes a homogeneous composition containing an unusually large amount of the metal. The mechanism of the formation of the homogeneous product is not fully understood. It is believed, however, that carbonation converts the excess metal base to a carbonate or bicarbonate which forms a homogeneous complex with the metal salt of the oil-soluble acid. The complex is readily soluble in hydrocarbon solvents such as benzene, xylene, and mineral oil. However, it is not necessary for all of the metal base present in the process mixture to be so coverted by carbonation to produce a soluble, homogeneous product. In many instances, a homogeneous product is obtained when as little as 75% of the excess metal base is carbonated. For the sake of convenient reference in the specification and the claims of this invention, the term "carbonated, basic alkaline earth metal complex" (of the oil-soluble acid or ester) designates the homogeneous, carbonated product without specific reference to the degree of conversion of the excess metal base by carbonation.

The formation of a carbonated, basic alkaline earth metal complex having a metal ratio of at least about 4.5 requires the presence in the carbonation step of a promoting agent such as is described previously. The amount of the promoting agent to be used is best defined in terms of its chemical equivalence per equivalent of the long chain sulfonic acid, carboxylic acid or ester used. The amount may be as little as 0.1 equivalent or as much as 10 equivalents or even more per equivalent of the acid or ester. The preferred amount is within the range of from 0.25 to 5 equivalents per equivalent of the acid or ester. It will be noted that the equivalent weight of the promoting agent is based upon the number of functional radicals in the molecule. To illustrate, the equivalent weight of an alcohol or of a phenol is based upon the number of hydroxy radicals in the molecule; that of an amine is based upon the number of amino radicals in the molecule; etc. Thus, methanol has one equivalent per mole; ethylene glycol has 2 equivalents per mole; a bisphenol has 2 equivalents per mole; phenylenediamine has 2 equivalents per mole; nitropropane has 1 equivalent per mole; acetylacetone has 1 equivalent per mole; etc.

The carbonation temperature depends to a large measure upon the promoting agent used. When a phenol is used as the promoting agent the temperature usually ranges from about 80° to 300° C. and preferably from 100° to 200° C. When an alcohol or a mercaptan is used as the promoting agent the carbonation temperature usually will not exceed the reflux temperature of the reaction mixture and preferably will not exceed 100° C.

After carbonation, the promoting agent, if it is a volatile substance, may be removed from the product by distillation. If the promoting agent is a non-volatile substance it is usually allowed to remain in the product. The methods for preparing the carbonated, basic metal complexes include those described in, e.g., U.S. Patents Nos. 2,616,905, 2,616,924, 2,695,910, 2,971,014, 3,027,325 and copending application, Ser. No. 858,603, filed on Dec. 10, 1959.

It has been found that an oil solution of a carbonated, basic alkaline earth metal complex having a metal ratio of at least about 4.5, upon heating in contact with oxygen, gradually increases in viscosity until it becomes a grease. The mechanism of this gelation is not fully understood. It is believed, however, that the gelation may be the result of a crystallization of an alkaline earth metal salt such as calcium carbonate from the solution or the oxidation of one of the ingredients of the oil solution such as the oil itself, the promoter used in making the basic metal salt complex, or the organic acid or ester radical of the metal salt complex. It may well be that the gelling process is caused by one or a combination of the aforementioned reactions or by other still unknown reactions. In any case, it is accelerated by improving the contact of oxygen with the oil solution of the carbonated, basic metal complex and by increasing the temperature. The rate of thickening is likewise increased when a very small amount of an oxidation catalyst is added to the oil solution to be gelled. Oil-soluble salts such as the naphthenates, oleates, palmitates, stearates, etc., of many metals such as, for example, iron, copper, nickel, cobalt, etc., are effective catalysts. Oxides of multivalent metals such as vanadium, chromium, manganese, molybdenum, etc., are also effective catalysts for the process when they are finely dispersed in the reaction mixture. It has been noted that a commercial oil-soluble cobalt oxidation catalyst solution containing 6% of cobalt as cobalt naphthenate is especially effective in concentrations of from as little as about 0.01% up to about 2% or even more by weight of cobalt.

A similar concentration range of the other catalysts mentioned above is also effective.

Gelling of the carbonated, basic alkaline earth metal complex is effected by contacting the heated complex with oxygen; however, in the interest of safety and economy a mixture of oxygen and other inert gases is usually employed. Air is the most desirable form in which oxygen may be used in the process from the standpoint of economy, but a mixture of oxygen and another inert gas such as carbon dioxide may also be used.

The intimacy of contact of the oil solution of carbonated, basic metal complex with oxygen has a marked effect on the rate of gelation. It has been observed (Example A below) that an oil solution of a carbonated, basic calcium sulfonate which is heated without agitation at 205° C. in an open vessel thickens to a soft grease in 18 days whereas a similar solution which is agitated while air is passed through it at a rapid rate thickens to a hard grease in only one day (Example C below). It is, therefore, desirable to keep the reaction time to a minimum by effecting as intimate contact as possible between the oil solution of the basic metal complex and oxygen by thorough mixing and by introduction of air or oxygen at as rapid a rate as possible. In most instances, the rate of oxygen introduction will be at least about 0.2% and should be at least about 1%, and may be as high as 100% by volume per minute based on the volume of the oil solution of carbonated, basic metal complex being treated.

The rate of gelation is also increased by an increase in temperature. An oil solution of a carbonated, basic calcium sulfonate is thickened when air is passed through it at a temperature above about 150° C. The reaction can usually be carried out at temperatures of from about 150° C. to about 300° C. or even higher. For reasons of economy of equipment and labor it is desirable to carry out the gelling process at a temperature of at least about 175° C. but below the decomposition temperature of the gelled product. Temperatures below about 150° C. are generally not useful.

The concentration of the carbonated, basic metal complex in the oil solution to be gelled should be at least about 10% by weight. If the concentration is below about 10%, a grease usually cannot be formed by the process. There should also be a sufficient quantity of mineral oil in the solution so that the initial mixture of the grease forming process is fluid. Ordinarily the solution should contain at least about 30% by weight of a mineral oil. The mineral oil useful herein is preferably one having a viscosity value ranging from about 50 SUS (Saybolt Universal seconds) at 100° F. to about 500 SUS at 210° F. Especially useful are mineral oils of from about SAE 5 to about SAE 120. The source of the mineral oil is not critical.

The mineral oil solution of the carbonated, basic alkaline earth metal complex can be obtained by preparing it in the presence of mineral oil as a diluent. Alternatively, the carbonated, basic alkaline earth metal complex may be prepared in the presence of a solvent other than a mineral oil and the solvent removed by distillation after addition of the mineral oil. It is important in the formation of a grease by the process of this invention that the mineral oil solution of the basic metal complex be substantially free from insoluble contaminants. If any contaminants are present, as a result, for example, of insufficient carbonation of the alkaline earth metal base used in preparing the carbonated basic metal complex, the mineral oil solution is preferably filtered or centrifuged before it is used in the process of this invention. It is desirable to remove any insoluble contaminants since unless they are removed, the resulting grease in most cases will not have the desired degree of homogeneity.

The following examples illustrate the preparation of carbonated, basic alkaline earth metal complexes useful in the process of this invention.

EXAMPLE 1

A mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% aqueous solution of calcium chloride and 72 parts of lime (90% purity) at 100° C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to distill off methyl alcohol and water and the resulting oil solution of the basic calcium sulfonate is filtered. The filtrate is found to have a calcium sulfate ash content of 16% and a metal ratio of 2.5. A mixture of 1,305 parts of the above carbonated calcium sulfonate, 930 parts of mineral oil, 220 parts of methyl alcohol, 72 parts of isobutyl alcohol, and 38 parts of amyl alcohol is prepared, heated to 35° C., and subjected to the following operating cycle four times; mixing with 143 parts of 90% calcium hydroxide and treating the mixture with carbon dioxide until it has a base number of 32–39. The resulting product is then heated to 155° C., during a period of 9 hours to remove the alcohols and is then filtered through a siliceous filter-aid at this temperature. The filtrate has a calcium sulfate ash content of 39.5% and a metal ratio of 12.2.

EXAMPLE 2

A highly basic metal salt is prepared by mixing together 855 parts of mineral oil, 110 parts (0.58 equivalent) of heptylphenol and adding 588 parts (7.66 equivalents) of barium oxide in 1 hour while heating to 85° C. Steam is passed through the mixture at 30 parts by weight per hour for 3 hours while heating to 150° C. to effect complete hydration of the excess barium oxide. The mixture is blown with nitrogen for 1 hour to lower the water content to 0.7–0.4% by weight. In 0.3 hour, 375 parts (0.89 equivalent) of sperm oil is added and the mixture is blown with carbon dioxide for 4.5 hours at 150–155° C. The product is dried by nitrogen blowing at 150–155° C. for 3 hours to lower the water content to 0.2%. The product is filtered and then adjusted to a sulfate ash content of 35% by addition of oil. The product has the following analysis: 35.0% $SO_4$ ash; 163 reflux base number; and has a metal ratio of 7.78.

EXAMPLE 3

A mixture of 811 parts by weight of a mineral oil, 145 parts (0.5 equivalent) of tall oil acid (having an equivalent weight of 290), 437 parts of iso-octyl alcohol, 44 parts of water and 54 parts (0.675 equivalent) of barium oxide is heated to 93° C. and 1,046 parts (13 equivalents) of barium oxide is added gradually at 93°–105° C. followed by the addition of 133 parts of water with a temperature rise to 140° C. The mixture is heated at 150° C. with nitrogen blowing for 4 hours and 855 parts (2.92 equivalents) of additional tall oil acid is added in 1 hour at 149°–152° C. An additional 472 parts of oil is added to the mixture and it is blown with carbon dioxide until substantially neutral. The mixture is heated to 155° C./25 mm. Hg and then blown with nitrogen at 155° C./70 mm. to remove water and about 80% of the iso-octyl alcohol. The resulting oil solution of basic barium salt is filtered. The filtrate has a barium sulfate ash of 41.5% and a metal ratio of 4. A mixture of 2,000 parts of the above carbonated basic barium salt, 300 parts of iso-octyl alcohol, 54.5 parts of water and 307 parts of barium oxide is heated to 140° C. and the mixture is blown with carbon dioxide until it has a neutralization number of 0. The resulting product is then heated to 180° C./30 mm. to remove water and iso-octyl alcohol and is then filtered at this temperature. The filtered product has a barium sulfate ash of 53.75% and a metal ratio of 5.33.

EXAMPLE 4

A basic metal complex is prepared by the process of Example 1 except that the amount of the slightly basic calcium sulfonate used is 1,672 parts and the amount of the calcium hydroxide used is 1,062 parts. The resulting highly basic metal complex has a metal ratio of 19 and a calcium sulfate ash content of 54.7%.

EXAMPLE 5

A highly basic metal complex is prepared by the procedure of Example 1 except that the slightly basic calcium sulfonate starting material is replaced with a mixture of that basic calcium sulfonate (555 parts by weight) and 694 parts of tall oil acids (having an equivalent weight of 340) and the amount of calcium hydroxide used is 772 parts by weight. The resulting metal complex has a calcium sulfate ash content of 45%, a metal ratio of 7.9, and an oil content of 32%.

EXAMPLE 6

To a mixture of 1,145 grams of a mineral oil solution of a 40% solution of barium mahogany sulfonate (1 equivalent) and 100 grams of methyl alcohol at 55° C. there is added 220 grams of barium oxide while the mixture is being blown with carbon dioxide at the rate of 2–3 cubic feet per hour. To this mixture, there is added an additional 78 grams of methyl alcohol and then 460 grams of barium oxide while the mixture is being blown with carbon dioxide. The carbonated product is heated to 150° C. for 1 hour and filtered. The filtrate is found to have a barium sulfate ash content of 53.8% and a metal ratio of 8.9.

EXAMPLE 7

A carbonated basic metal complex is prepared in accordance with the procedure of Example 6 except that a total of 15 equivalents of barium oxide is used per equivalent of the barium mahogany sulfonate. The product is found to have a metal ratio of 13.4.

EXAMPLE 8

To a mixture of 3,245 grams (12.5 equivalents) of barium petroleum sulfonate, 1,460 grams (7.5 equivalents) of heptylphenol, and 2,100 grams of water in 8,045 grams of mineral oil there is added at 82° C., 7,400 grams (96.5 equivalents) of barium oxide. The addition of barium oxide causes the temperature to rise to 145° C. which temperature is maintained until all of the water has been distilled. The mixture is then blown with carbon dioxide until it is substantially neutral. The product is diluted with 5,695 grams of mineral oil and filtered. The filtrate is found to have a barium sulfate ash content of 30.5% and a metal ratio of 8.1.

The following examples illustrate the process for the preparation of the homogeneous grease compositions of this invention (the penetration values reported herein are obtained by the ASTM D–217 procedure at 77° F. unless otherwise stated).

EXAMPLE A

A 500-gram portion of the carbonated, basic metal complex of Example 1 is held for a period of 18 days at 205° C. in an air atmosphere. At the end of this period the material takes on a gel-like appearance. The gelled product is blended with an equal weight of oil having a viscosity of 2,000 SUS at 100° F. and the resulting gel has an unworked penetration at 77° F. of 253.

EXAMPLE B

A 1-liter 3-necked rounded bottom flask is charged with 600 grams of the product of Example 1. The material is heated to 150° C. and oxygen is passed through the material with stirring at a rate of 0.25 cubic feet per hour for 15 hours. The product is a grease.

EXAMPLE C

Air at the rate of 5 cubic feet per hour is blown through a carbonated, basic calcium complex similar to that made by the process of Example 1 having a calcium sulfonate ash content of 43.1% while it is stirred rapidly at 205° C. for 24 hours. The product, on cooling, is a gel having a calcium sulfate ash content of 48.14% and reflux base number of 368.

EXAMPLE D

A 5-liter 4-necked flask is charged with a mixture of 2,000 grams of the carbonated, basic calcium complex similar to that made by the process of Example 1 and having a sulfate ash content of 43.1% and 1.0% (0.06% of cobalt) of a commercial liquid oxidation catalyst containing 6% by weight of cobalt as the naphthenate salt. The mixture is heated to 205° C. and blown with air at 5 cubic feet per hour for 16 hours at 203°–207° C. An additional 1.0% portion of the catalyst (0.06% of cobalt) is added after 5 hours. The product, on cooling, is a gel having a calcium sulfate ash content of 45.92% and a reflux base number of 346.

EXAMPLE E

A gelled composition is obtained by the process of Example C when the product of Example 4 is blown with air for 28 hours at 190° C.

EXAMPLE F

A gelled composition is obtained by the process of Example C when the carbonated, basic barium complex of Example 2 is air blown for 44 hours at 200° C. The product is a grease and is found to have a penetration at 77° F. of 72.

EXAMPLE G

A gelled composition is formed when the carbonated, basic barium complex of Example 2 is treated as in Example D with 1.0% of the cobalt catalyst and air blown for 24 hours at 200° C. The product is found to have a penetration value at 250° F. of 332 and a penetration at 76° F. of 107.

EXAMPLE H

When the carbonated, basic barium complex of Example 3 is treated according to the process of Example C, a grease is obtained.

EXAMPLE I

The carbonated, basic calcium complex of Example 5 is transformed into a grease according to the procedure of Example C at 200° C. in 30 hours.

EXAMPLE J

The carbonated, basic, barium sulfonate complex of Example 6 is treated according to the procedure of Example D at 220° C. for 22 hours. The product is a grease.

EXAMPLE K

The carbonated, highly basic, barium petroleum sulfonate complex of Example 7 is converted by the process of Example D at 175° C. in 28 hours to a grease composition.

EXAMPLE L

The carbonated, basic barium complex of Example 8 is converted by the process of Example C to a grease in 28 hours at 205° C.

EXAMPLE M

The carbonated, basic barium complex of Example 8 is thickened to a grease by the process of Example D except that it is blown with oxygen for 18 hours at 150° C.

The greases of this invention are high quality lubricants characterized by homogeneity, high basicity, and stability to heat, moisture, and working. They may vary in consistency from the so-called number 0 grade to number 6 grade, the former designating greases having penetration values of 355–385 and the latter designating greases having penetration values of 85–115 (according to ASTM D–217 procedure at 77° F).

The greases of this invention also have excellent load-carrying properties and because of their high basicity or "reserve alkalinity" they are especially useful in lubricating equipment which handles acidic materials such as are encountered in food processing, refinery processes and the like.

The gelled products of this invention are useful, in addition, as thixotropic agents to maintain a suspension of solids in an organic liquid medium such as the pigments in a paint formulation or to thicken a liquid, polymerizable monomeric material to be applied to a surface and polymerized in place to a protective or decorative coating.

The thickened mineral oil compositions of this invention are also useful as additives in hydrocarbon oil compositions to improve their viscosity index values. When used for this purpose they are usually present in a hydrocarbon oil at concentrations within the range of from about 1% to about 30% by weight.

The grease compositions formed by the process of this invention, in addition to being high quality lubricants, are excellent corrosion inhibitors when applied as a protective layer on metal surfaces. A particularly useful application for these corrosion inhibitors lies in their use as undercoating compositions for automotive vehicles. For this purpose, it is desirable to modify the grease to a firmer, non-tacky, adherent coating material to avoid dirt pick-up. This may be accomplished by physically compounding the grease with a small amount of a compatible hydrocarbon resin. Suitable resins have been found to include coumaroneindene polymers, polystyrenes, polymerized beta-pinenes, petroleum hydrocarbon resins and high molecular weight polybutenes having softening points in the range of from about 100° C. to about 150° C. For instance, a firm automotive undercoating grease composition is formed when a mixture of 1,000 parts of the carbonated, basic calcium complex of Example 1, 165 parts of a commercial petroleum hydrocarbon resin having a softening point range of 110°–120° C., and one part of a commercial liquid oxidation catalyst containing 6% by weight of cobalt is air blown while being thoroughly mixed at 205° C. for 24 hours. Protective coatings of this type are described more fully in commonly assigned co-pending applications 279,701 and 300,691, now abandoned, and 379,717.

I claim the following:

1. The process for preparing a homogeneous gel comprising contacting with oxygen at a rate of at least about 0.2% up to 100% by volume per minute and at a temperature of from about 150° C. to about 300° C. a fluid mineral oil solution containing from about 10% to about 70% by weight of a carbonated, basic complex of an alkaline earth metal with an organic compound having at least about 12 aliphatic carbon atoms and selected from the group consisting of sulfonic acids, carboxylic acids, alkaline earth metal salts of such sulfonic and carboxylic acids, and carboxylic acid esters, said carbonated, basic complex having a metal ratio of at least about 4.5.

2. The process of claim 1 wherein the alkaline earth metal is calcium.

3. The process of claim 1 wherein the alkaline earth metal is barium.

4. The process of claim 1 wherein the said organic compound of the carbonated, basic complex is a sulfonic acid.

5. The process of claim 1 wherein the said organic compound of the carbonated, basic complex is a fatty acid ester.

6. The process of preparing a homogeneous gel according to claim 1 comprising contacting with air at a rate of at least about 1% by volume per minute and at a temperature of from about 150° C. to about 300° C. a fluid mineral oil solution containing from about 10% to about 70% by weight of a carbonated, basic complex of an alkaline earth metal with a member selected from the class selected from an oil-soluble sulfonic acid or alkaline earth metal salt thereof having from about 12 to about 75 aliphatic carbon atoms, said carbonated, basic complex having a metal ratio of from about 8 to about 20.

7. The process of preparing a homogeneous gel according to claim 1 comprising contacting with air at a rate of at least about 1% by volume per minute and at a temperature of about 150° C. to about 300° C. a fluid mineral oil solution containing from about 10% to about 70% by weight of a carbonated, basic complex of an alkaline earth metal with an oil-soluble fatty-acid ester having from about 12 to about 75 aliphatic carbon atoms, said carbonated, basic complex having a metal ratio of from about 8 to about 20.

8. The process of preparing a homogeneous gel according to claim 1 comprising contacting with air at a rate of at least about 1% by volume per minute and at a temperature of about 150° C. to about 300° C. a fluid mineral oil solution containing from about 10% to about 70% by weight of a carbonated, basic calcium petroleum sulfonate having a metal ratio of from about 8 to about 20.

9. The process of preparing a homogeneous gel according to claim 1 comprising contacting with air at a rate of at least about 1% by volume per minute and at a temperature of from about 150° C. to about 300° C. a fluid mineral oil solution containing from about 10% by weight of an oil-soluble, carbonated, basic barium complex of sperm oil, said barium complex having a metal ratio of from about 8 to about 20.

10. The product of the process of claim 1.

11. The product of the process of claim 8.

12. The product of the process of claim 9.

13. A lubricating composition comprising a major amount of a lubricating oil and from about 0.1% to about 20% by weight of the product of claim 10.

14. A lubricating composition comprising a major amount of a lubricating oil and from about 0.1% to about 20% by weight of the product of claim 11.

References Cited

UNITED STATES PATENTS

| | | | |
|---|---|---|---|
| 3,118,838 | 1/1964 | Scherer | 252—15 |
| 3,149,074 | 9/1964 | Tillman | 252—33 |
| 3,242,079 | 3/1966 | McMillen | 252—18 |

DANIEL E. WYMAN, *Primary Examiner.*

I. VAUGHN, *Assistant Examiner.*